Figure 1:
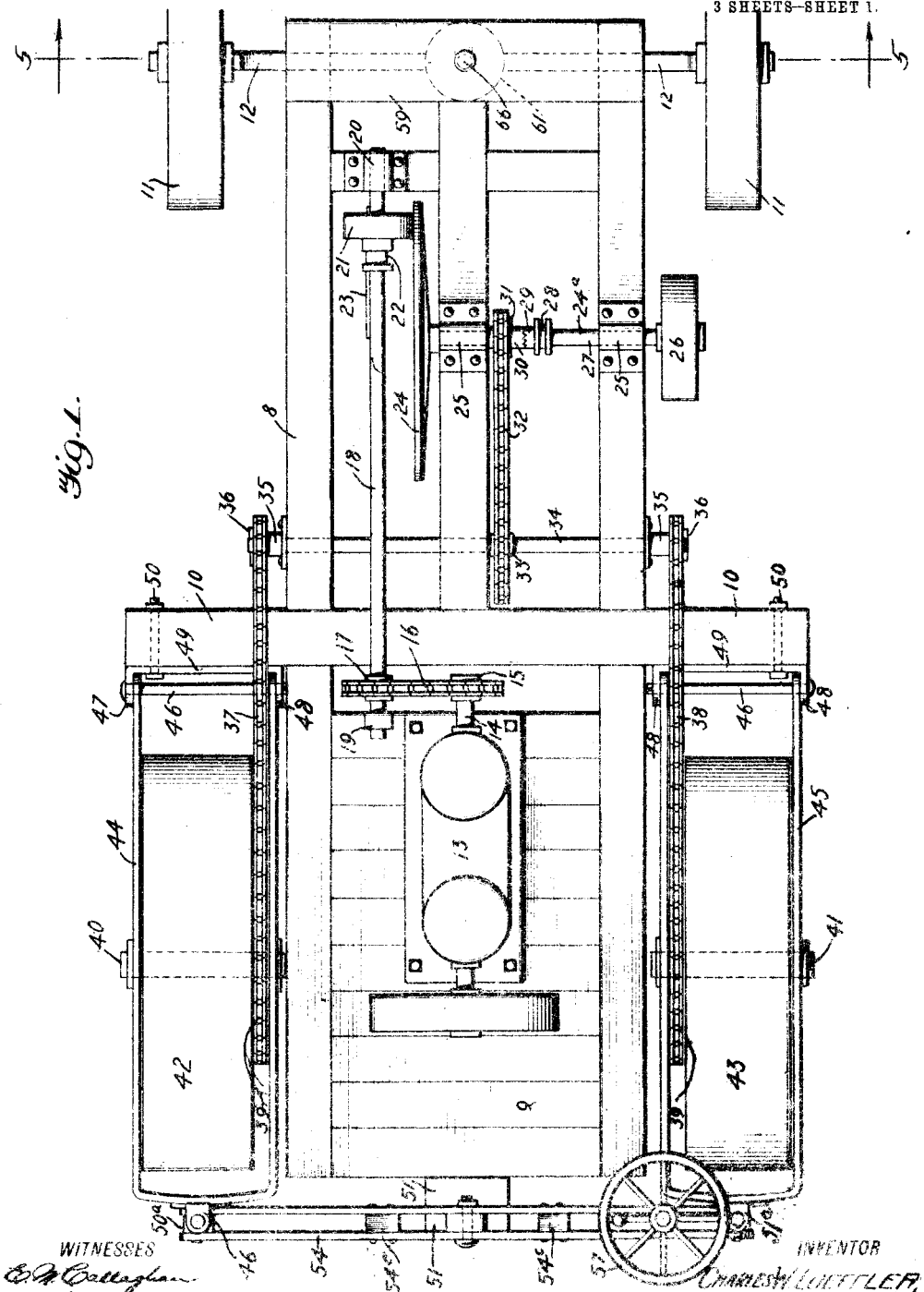

C. W. LOEFFLER.
TRACTOR.
APPLICATION FILED APR. 24, 1914.

1,131,394.

Patented Mar. 9, 1915.
3 SHEETS—SHEET 1.

WITNESSES
E. M. Callaghan
Walton Harrison

INVENTOR
Charles W. Loeffler,
BY Munn & Co
ATTORNEYS

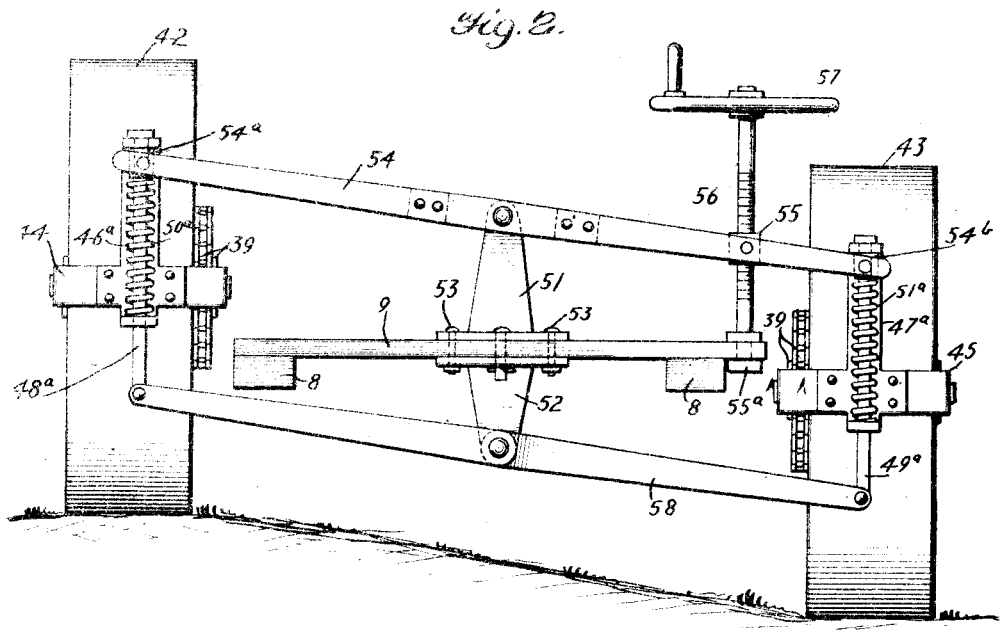

C. W. LOEFFLER.
TRACTOR.
APPLICATION FILED APR. 24, 1914.
1,131,394.
Patented Mar. 9, 1915.
3 SHEETS—SHEET 3.
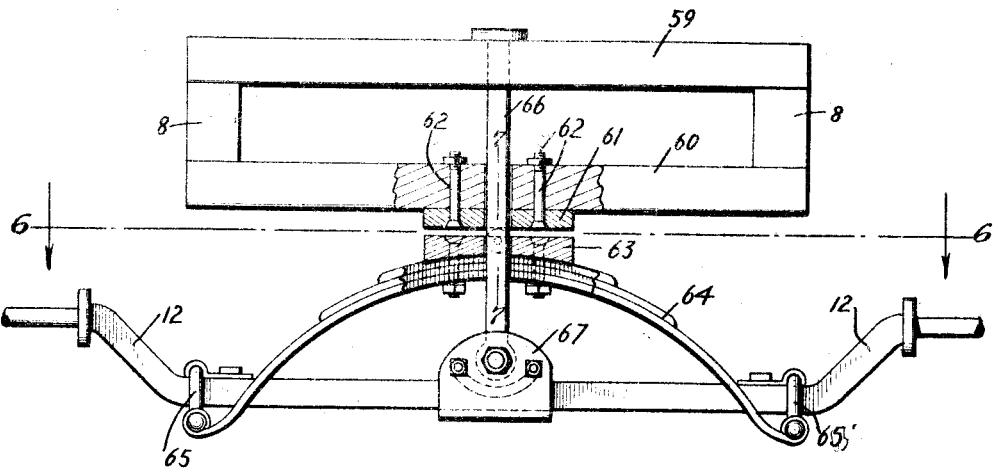
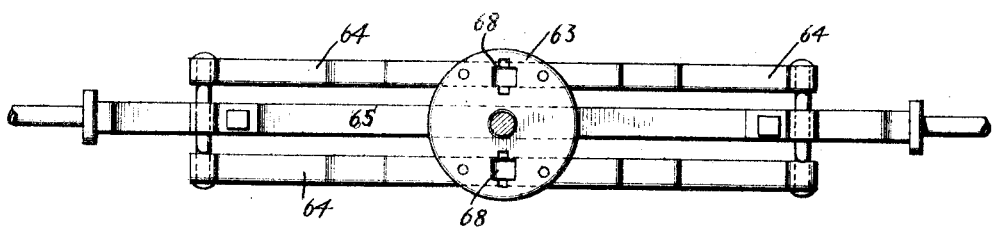
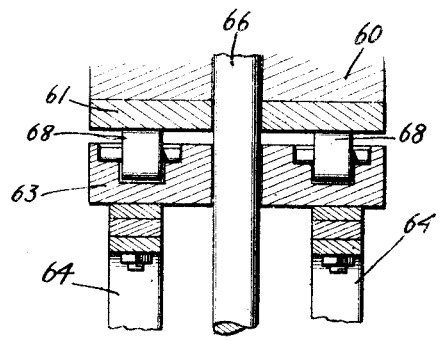
WITNESSES
E. M. Callaghan
Walton Harrison
INVENTOR
CHARLES W. LOEFFLER,
BY Munn & Co
ATTORNEYS

UNITED STATES PATENT OFFICE.

CHARLES WM. LOEFFLER, OF SOLON TOWNSHIP, LEELANAU COUNTY, MICHIGAN.

TRACTOR.

1,131,394.   Specification of Letters Patent.   Patented Mar. 9, 1915.

Application filed April 24, 1914. Serial No. 834,111.

*To all whom it may concern:*

Be it known that I, CHARLES W. LOEFFLER, a citizen of the United States, and a resident of Solon township, in the county of Leelanau and State of Michigan, have invented a new and Improved Tractor, of which the following is a full, clear, and exact description.

My invention relates to tractors, my more particular purpose being to provide a tractor with running gear so arranged that the body or platform of the tractor may be maintained substantially level while the wheels engage the ground at different levels.

More particularly stated, I seek to produce a tractor admitting of general use, but of special service in connection with plowing the lands, the rear wheels of the tractor being carried each by a frame, the two frames being pivotally mounted upon the body portion, so that one of the rear wheels may pass along in a furrow, the other resting upon the undisturbed portion of the ground and the platform of the tractor remaining level so that the engine and parts associated therewith occupy their respective normal positions. In doing this, the engine and its accompanying parts are poised evenly and the tendency toward listing is thus effectively prevented. I also seek to provide means, controllable at the will of the operator for changing the level of the platform relatively to the wheels and more particularly to the rear wheels, so as to adapt the machine for service upon hillsides and other inclined surfaces varying in steepness of grade. I further seek to provide a tractor with suitably proportioned spring connections, used with the front axle and parts associated therewith for allowing a maximum of flexibility and resilience in this part of the machine. In addition I seek to cushion the platform relatively to the rear wheels in such manner as not to interfere with any of the foregoing objects.

My invention comprehends a number of other improvements relating to various parts of the mechanism of the tractor for improving the general efficiency of the same.

Reference is to be had to the accompanying drawings forming a part of this specification, in which similar characters of reference indicate corresponding parts, and in which—

Figure 1 is a plan view of the tractor; Fig. 2 is a rear elevation of the same; Fig. 3 is a detail showing in plan one of the guiding levers for the rear wheels; Fig. 4 is a fragmentary side elevation of one of the wheels and the frame in which the same is mounted; Fig. 5 is a fragmentary front elevation of the machine, certain parts being broken away; Fig. 6 is a section on the line 6—6 of Fig. 5, looking in the direction of the arrow and showing part of the mechanism of the fifth wheel; and Fig. 7 is a section on the line 7—7 of Fig. 5, showing the mechanism of the fifth wheel.

The tractor frame is shown at 8 and has generally the form of an elongated rectangle. This frame carries a massive floor 9 and is provided with a cross bar 10, extending laterally from the sides of the frame. The front wheels are shown at 11 and the front axle at 12. The engine is shown at 13 and rests upon the floor 9. The engine shaft 14 carries a sprocket wheel 15 and engaging the latter is a sprocket chain 16, which engages another sprocket wheel 17, the latter being mounted rigidly upon a revoluble shaft 18. This shaft is supported in bearings 19, 20. Mounted upon the shaft 18 is a friction pulley 21 and connected with this friction pulley is a collar 22 forming practically a hub. The friction pulley 21 with its collar 22 are slidably mounted upon the shaft 18 and extending through them is a spline 23 carried by the shaft. A friction disk 24 engages the friction pulley 21 and is driven by it. As the pulley 21 is shifted along the shaft 18, by aid of the collar 22, the point of contact between the friction pulley 21 and the friction disk 24 is changed so that the shaft 18 being driven at a given rate of speed, the speed of the disk 24 may be changed at the will of the operator.

The friction disk 24 is mounted rigidly upon a revoluble shaft 24ª, the latter being mounted in bearings 25 carried by the framework. A fly wheel 26 is mounted rigidly upon the shaft 24ª. This shaft carries a spline and also a collar 28, which engages the spline and is movable along the shaft 24ª, in the direction of the axis thereof. Connected with the collar 28 is a clutch member 29 and adjacent this clutch member is another clutch member 30, which is rigid upon the shaft. By shifting the clutch member 29 into and out of engagement with the clutch member 30, the shaft 24ª may be thrown into and out of action. Mounted rigidly upon the shaft 24ª is a sprocket wheel 31 and engaging the latter is a sprocket chain 32. This sprocket chain also engages a sprocket wheel 33. This sprocket wheel is mounted rigidly upon a revoluble shaft 34 which is mounted in bearings 35 carried by the framework. Two sprocket wheels 36 are mounted rigidly upon the ends of the shaft 34 and are engaged by two sprocket chains 37, 38, these chains engaging two sprocket wheels 39 and the latter being mounted rigidly upon two shafts 40, 41.

The rear wheels of the tractor are shown at 42, 43, the wheel 42 being located within a frame 44 and the wheel 43 being similarly disposed within a frame 45. These two frames are mounted upon pins 46, the latter being carried by brackets 49, each bracket being provided for this purpose with a pair of ears 47, 48, through which the pins 46 extend. The brackets 49 are held in position by bolts 50 and the frames 44, 45 are adapted to swing upon the pins 46 as pivots.

Mounted upon the rear portion of the floor 9, is a bracket 51, having the general form of a pedestal, as may be understood from Fig. 2 and extending upwardly from the floor. Disposed upon the underside of the floor and extending downwardly from the same, is another bracket 52 having likewise the form of a pedestal. These two brackets are secured in position by bolts 53. Journaled upon the bracket 51 and extending crosswise of the framework is a guiding lever 54 having the form shown more particularly in Fig. 3. This guiding lever carries a nut 55 threaded internally and supported pivotally upon it. Extending through this nut is a screw 56 and mounted upon the upper end of this screw is a hand wheel 57 under control of the operator. The lower end of the screw 56 is provided with a pivotal connection 55ª, by aid whereof it is revolubly secured to one corner of the floor 9. The guiding lever 54 carries at its ends 2 pivotally mounted nuts 54ª, 54ᵇ. The guiding lever is also provided with spacing blocks 54ᶜ, as indicated in Fig. 3. Another guiding lever 58 is journaled upon the bracket 52 and extends parallel with the guiding lever 54.

Mounted upon the rear ends of the frames 44, 45, are two brackets 46ª, 47ª and extending through the bracket 46ª, is a link 48ª, having the general form of a rod and pivotally connected at its ends with the guiding levers 54, 58. A spring 50ª encircles the link 48ª and at its bottom engages the bottom portion of the bracket 46ª, while the top end of the spring engages the nut 54ª. Similarly a spring 51ª engages at its bottom, a portion of the bracket 47ª and at its top the nut 54ᵇ. The springs 50ª, 51ª, by sustaining the downward pressure of the guiding levers 54 and 58, support the weight of the platform carrying the engine. The operator by turning the hand wheel 57 can enable one of the wheels 42 to be raised to a higher level than the other, as indicated in Fig. 2, the floor 9, however, being maintained at a constant level and the guiding levers 54 and 58 always remaining parallel, as may be understood from Fig. 2.

The frame 8 is provided with two front plates 59, 60 of the form, shown more particularly in Fig. 5. A metallic disk 61 is secured upon the under side of plate 60, by bolts 62. Another disk 63 having the form shown more particularly in Fig. 6 is provided with anti-friction rollers 68 which engage the disk 61. The parts thus described together constitute the fifth wheel of the tractor. The disk 63 is mounted upon springs 64 of the type known in this art as carriage springs, the latter being supported by the links 65 for this purpose. Owing to the resilience of the springs 64, the front axle 12 has a sufficient angular play relatively to the top of the tractor to enable the front wheels 11 to assume different levels without disturbing the other parts.

The operation of my device is as follows: The parts assembled and arranged as described and the engine 13 being started into action, the operator judges by the inclination of the land to be plowed, the extent to which one of the rear wheels must be elevated relatively to the other, while the machine is passing along—say on a hillside and he turns the wheel 57 until the floor 9, under the conditions just indicated, is level. The engine 13 now occupies its normal position. The clutch member 29 being thrown into engagement with the clutch member 30 and the friction pulley 21 being adjusted relatively to the friction disk 24, the tractor moves ahead at the required speed.

If in plowing, the machine is brought to a sloping stretch of land, where the inclination differs from that of the piece just plowed, the operator by turning the hand wheel 57 again adjusts the relative elevation of the rear wheels 42, 43, so that the floor 9, is still maintained level.

It will be noted that owing to the action of the springs 50ª, 51ª, the rear portion of the tractor body is spring-supported, and yet the vertical planes through the two wheels 42, 43, always remain parallel. The frames 44 and 45, being mounted to swing upon the pins 46 as above described are capable of executing any degree of bodily motion necessary to enable the guiding levers 54, 58 to assume the various angles necessary in order to maintain the floor 9 level under practically any conditions where the tractor can run at all.

I do not limit myself to the precise arrangement shown, as variations may be made therein without departing from the spirit of my invention.

Having thus described my invention, I claim as new and desire to secure by Letters Patent:—

1. In a tractor, the combination of a main frame serving as a vehicle body, independent frames pivotally mounted upon said main frame, vehicle wheels journaled within said frames, and a lever mechanism connected with the free ends of the frames and controllable at the will of the operator for simultaneously adjusting said vehicle wheels to relatively different levels.

2. In a tractor, the combination of a frame provided with a cross bar having greater length than the general width of the frame and extending therefrom, brackets mounted upon the extending portions of said cross bar, pivot pins carried by said brackets, frames mounted to swing upon said pivot pins, said frames extending rearwardly from said cross bar, wheels journaled within said frames for the purpose of engaging the ground, gearing for turning said wheels, and mechanism connected with said frames for maintaining said wheels parallel.

3. In a tractor, the combination of a frame provided with a cross bar having a length greater than the width of said frame, a pair of frames pivotally mounted upon the extending portions of said cross bar, wheels journaled in said frames and adapted to engage the ground, brackets mounted upon the rear ends of said frames, guiding levers journaled upon said frame and extending into proximity to said brackets, and links slidably engaging said brackets and guided thereby, each link being connected to all of said guiding levers.

4. In a tractor, the combination of a main frame serving as a vehicle body, a pair of frames journaled upon said main frame and extending rearwardly, guiding members carried by said frames and located adjacent the rear ends thereof, guiding levers journaled upon said main frame, and adapted to swing relatively thereto, and links connecting said guiding levers in order to maintain the same parallel, said links also engaging said guiding members.

5. In a tractor, the combination of a main frame serving as a vehicle body, a pair of frames pivotally connected with said main frame and adapted to swing relatively to the same, brackets carried by said frames, links extending through said brackets and guided thereby, guiding levers connected with said links, said guiding levers being journaled upon said main frame, and springs engaging said guiding levers and said brackets.

6. In a tractor, the combination of a main frame serving as a vehicle body, a pair of frames pivotally mounted upon said main frame and adapted to swing relatively to the same, guiding levers journaled upon said main frame, connections from said guiding levers to said frames, and mechanism connected with said guiding levers and with said main frame and controllable at the will of the operator for shifting said guiding levers to different angles relatively to said main frame.

7. In a tractor, a main frame, independent and pivotally mounted frames, wheels mounted in the frames, a centrally pivoted support having yielding connections at its ends with the free ends of the wheel carrying frames, and adjusting means between the support and main frame.

8. In a tractor, a main frame, wheel carrying frames, each pivoted at one end to the main frame, a wheel mounted in each frame, a centrally pivoted support, yielding and slidable connections between the ends of the support and the free ends of the wheel carrying frames, and adjusting means between the support and main frame.

In witness whereof I have signed my name to this specification in the presence of two subscribing witnesses.

CHARLES WM. LOEFFLER.

Witnesses:
ELMER BILLMAN,
CHARLES BILLMAN.